United States Patent
Aloisio, Jr. et al.

(10) Patent No.: US 6,456,895 B1
(45) Date of Patent: Sep. 24, 2002

(54) METHOD AND APPARATUS FOR DETECTING CONDITIONS IN A UV CURING LAMP SYSTEM

(75) Inventors: Charles Joseph Aloisio, Jr., Atlanta, GA (US); Terry M. Sanderson, Tucson, AZ (US); John Michael Turnipseed, Lilburn, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/395,043

(22) Filed: Sep. 13, 1999

(51) Int. Cl.[7] .............................................. G06F 19/00
(52) U.S. Cl. ..................................... 700/122; 427/163.2
(58) Field of Search ................................ 700/117, 122, 700/198, 204; 427/163.2

(56) References Cited

U.S. PATENT DOCUMENTS

| | | | | |
|---|---|---|---|---|
| 4,410,344 A | * | 10/1983 | Iyengar ........................ 65/382 |
| 4,504,298 A | * | 3/1985 | Yokota et al. .................. 65/388 |
| 4,678,274 A | * | 7/1987 | Fuller .......................... 385/144 |
| 4,913,859 A | * | 4/1990 | Overton et al. ............. 264/1.27 |
| 5,037,763 A | * | 8/1991 | Pestice ......................... 436/172 |
| 5,076,658 A | * | 12/1991 | Hayden et al. ................. 385/1 |
| 5,092,264 A | * | 3/1992 | Overton et al. ............. 118/50.1 |
| 5,203,896 A | * | 4/1993 | Neuberger ................... 65/425 |
| 5,219,498 A | * | 6/1993 | Keller et al. ................. 264/408 |
| 5,320,658 A | * | 6/1994 | Ohga et al. ................... 65/435 |
| 5,418,369 A | * | 5/1995 | Moore et al. ................ 250/372 |
| 6,026,207 A | * | 2/2000 | Reddy et al. ................ 385/128 |
| 6,053,013 A | * | 4/2000 | Oh et al. ...................... 65/412 |
| 6,201,250 B1 | * | 3/2001 | Morlock ..................... 250/372 |

OTHER PUBLICATIONS

Rusconi et al., "Use of Variables Data Reporting for Optical Fiber Monitoring", 1992, IEEE, pp. 1767–1771.*
"Wave Guide", Encyclopedia Britannica Online.*

* cited by examiner

*Primary Examiner*—Leo Picard
*Assistant Examiner*—Chad Rapp
(74) *Attorney, Agent, or Firm*—Thomas, Kayden, Horstemeyer & Risley, LLP

(57) ABSTRACT

The present invention provides a method and apparatus for monitoring a UV curing lamp system to determine whether a UV-curable material passing through the curing lamp system is being properly cured. A thermal sensor is disposed to measure the temperature of gas being exhausted from a center tube of the UV curing lamp system. The center tube typically has nitrogen gas pumped into it to purge air from the center tube. The UV-curable material passes through the center tube. If a defect exists in the center tube, or if insufficient UV radiation is reaching the UV-curable material, the temperature of the gas stream exhausted from the center tube will drop. The temperature of the gas is compared to first and second threshold values, respectively, to determine whether a defect in the center tube exists or whether insufficient radiation is reaching the UV-curable material, respectively.

30 Claims, 5 Drawing Sheets

METHOD AND APPARATUS FOR DETECTING CONDITIONS IN A UV CURING LAMP SYSTEM

TECHNICAL FIELD OF THE INVENTION

The present invention relates to optical fiber manufacturing systems and, more particularly, to a method and apparatus for detecting various conditions in an ultraviolet (UV) curing lamp system to determine whether or not the conditions are suitable for properly curing a UV-curable material disposed in the UV curing lamp system.

BACKGROUND OF THE INVENTION

The successful implementation of a light wave communication system requires high quality light guide fibers having mechanical properties sufficient to withstand the stresses to which they are subjected. Each fiber must be capable of withstanding over its entire length a maximum stress level to which the fiber will be exposed during installation and service. The importance of fiber strength becomes apparent when one considers that a single fiber failure will result in the loss of several hundreds of active telephone and data circuits.

The failure of light guide fibers in tension is commonly associated with surface flaws which cause stress concentrations and lower the tensile strength below that of pristine unflawed glass. The size of the flaw determines the level of stress concentration and, hence, the failure stress. Even micron-sized surface flaws cause stress concentrations which significantly reduce the tensile strength of the fibers.

Long lengths of light guide fibers have considerable potential strength, but the strength is realized only if the fiber is protected with a layer of a coating material such as, for example, a polymer, soon after it has been drawn from a perform. This coating serves to prevent airborne particles from impinging upon and adhering to the surface of the drawn fiber and to prevent the surface of the fiber from coming into contact with atmosphere moisture, which would weaken it and possibly affect its transmission properties. Also, the coating shields the fibers from surface abrasion, which could occur as a result of subsequent manufacturing processes and handling during installation. The coating also provides protection from corrosive environments and spaces the fibers in cable structures.

Light guide fibers are usually coated during a coating process which typically involves drawing the light guide fiber through a reservoir of a liquid prepolymer material and then curing the liquid prepolymer material to harden it by exposing it to curing radiation, which normally is ultraviolet light. Ultraviolet light (UV) curing lamp systems are used to cure optical fiber coatings. Such lamp systems typically contain an array of focusing mirrors that focus the light from an ultraviolet bulb onto the product to be cured. Since the ultraviolet bulbs of the curing lamp systems generate a substantial amount of heat, the housing of the lamp system must be cooled to prevent damage to the internal components of the lamp system.

During the curing process, the fiber passes through a quartz center tube that runs the length of the focusing mirror assembly. The coating on the fiber will not cure properly in the presence of oxygen. Therefore, nitrogen gas ($N_2$) is pumped through the center tube in order to purge the oxygen from the center tube. If an air seal on the center tube becomes defective, or if a fracture in the center tube exists, air will enter the center tube, which will prevent the coating from being properly cured.

Also, if the UV bulb does not generate a sufficient amount of UV) radiation, the coating will not be properly cured. Also, dust and other particulates may accumulate on the parabolic mirrors and/or on the glass surface of the center tube, which may prevent sufficient UV radiation from reaching the coating on the optical fiber. These factors may also prevent the coating from being properly cured.

Therefore, the conditions of various components within the UV curing lamp system affect the curing process. When the LW curing lamp system is not functioning properly due to one of the aforementioned factors, the coating on the optical fiber will not be properly cured, which will result in defective optical fiber cables. It would be desirable to be able to detect when one or more conditions within the UV curing lamp system will result in the coating on the optical fiber not being properly cured so that the fiber manufacturing process can be halted until the faulty condition has been rectified. Currently, no techniques are utilized in the optical fiber manufacturing process to determine whether or not the conditions within the UV curing lamp system are suitable for properly curing the coating on the optical fiber.

UV curing lamp systems are used to cure other types of materials as well. For example, UV curing lamp systems are used to cure UV-curable inks, optical fiber over-coatings, etc. They are also utilized in the electronics industry. Currently, no techniques are used to determine whether or not these UV curing lamp systems are operating properly, or whether the inks are being properly cured.

Accordingly, a need exists for a method and apparatus for determining whether or not the conditions within a UV curing lamp system utilized in a UV curing process are adequate to properly cure whatever UV curable material is being cured in the UV curing lamp system.

SUMMARY OF THE INVENTION

The present invention provides a method and apparatus for monitoring a UV curing lamp system to determine whether or not the UV curing lamp system is operating properly and/or whether or not the UV-curable material is being properly cured. The UV curable material may be, for example, a UV-curable optical fiber coating layer or a UV-curable ink. A sensor is disposed to measure the temperature of gas being exhausted from a center tube of the UV curing lamp system. The center tube typically has nitrogen gas pumped into it to purge air from the center tube. The optical fiber having the UV-curable material (e.g., a coating layer) thereon passes through the center tube. If a defect exists in the center tube, or if insufficient UV radiation is reaching the UV-curable material, the temperature of the gas stream exhausted from the center tube will drop. The temperature of the gas is measured and compared to first and/or second threshold values to determine whether a defect in the center tube exists and/or whether insufficient radiation is reaching the UV-curable material, respectively.

These determinations preferably are made by a computer, but also may be made by a simple comparator circuit or by a human being. In accordance with the preferred embodiment, the determinations are made by a computer. The computer performs a defect detection method that compares the temperature with the first and/or second threshold values. The computer may be the computer that controls the operations of the optical fiber manufacturing process and may halt the manufacturing process upon determining that the UV-curable material is not being properly cured. The computer may also be a separate computer.

Other features and advantages of the present invention will become apparent to those skilled in the art from the following description, drawings and claims.

DETAILED DESCRIPTION OF THE INVENTION

Figure 1:
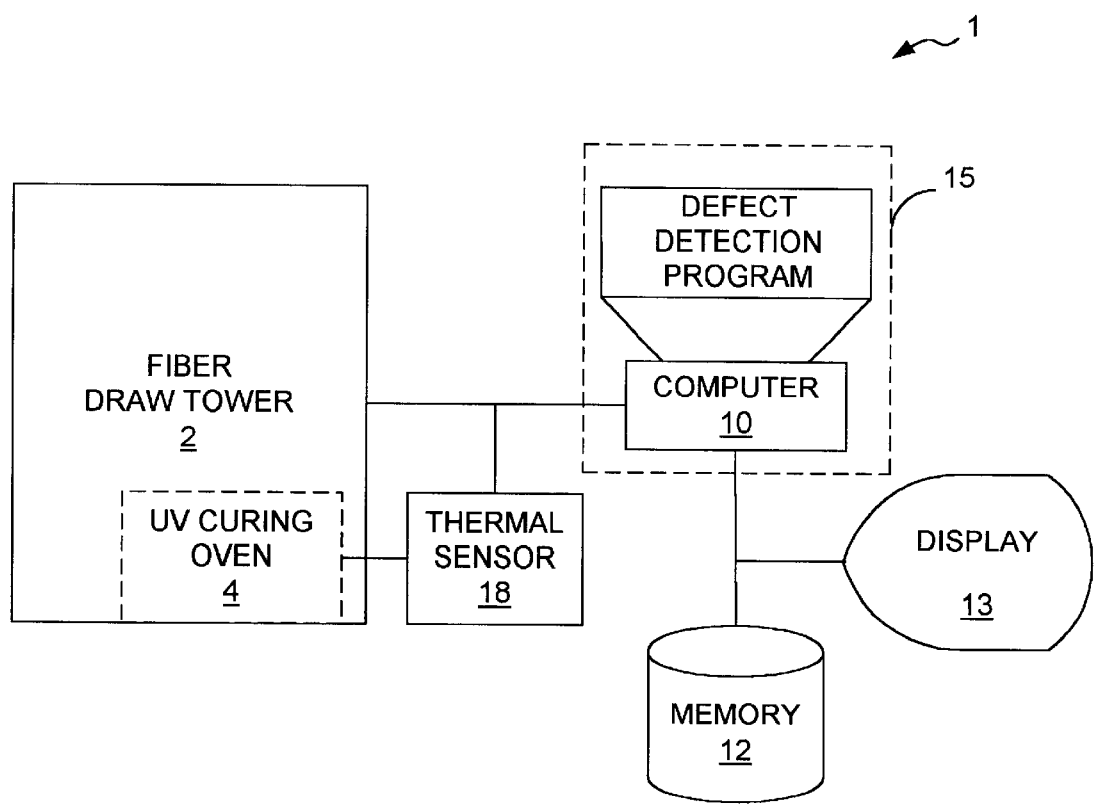
FIG. 1 is a functional block diagram illustrating various components of an optical fiber manufacturing system.

FIG. 1 s a functional block diagram illustrating various components of an optical fiber manufacturing system 1. The optical fiber manufacturing system 1 comprises a fiber draw tower 2, which comprises various components that are used in the optical fiber manufacturing process. For example, the fiber draw tower 2 includes a furnace (not shown) for heating the fiber preform, the mechanics for pulling the fiber from the preform, a coating applicator for applying a prepolymer coating layer to the optical fiber and a UV curing lamp system for curing the coating, which is shown in FIG. 1 and represented by the numeral 4. The UV curing lamp system 4 is discussed below in detail with reference to FIG. 2.

A computer 10 controls various operations of the fiber draw tower 2, which are well known in the art. The computer 10 is in communication with a memory component 12, which stores various programs utilized by the computer 10 and data utilized by and/or generated by the computer 10. The computer 10 is in communication with a display device 13 that is controlled by the computer 10. Various types of information concerning the operations of the fiber draw tower 2 are typically displayed on a display monitor 13 to allow an operator to monitor the optical fiber manufacturing process.

In accordance with the present invention, it has been determined that various conditions relating to the UV curing lamp system 4 can be detected by monitoring a nitrogen gas stream exhausted from the center tube of the UV curing lamp system 4. The temperature of the nitrogen gas within the center tube is typically approximately 200° F. when the UV curing lamp system 4 is operating properly. However, if an air seal of the center tube is defective, or if a fracture in the center tube exists, air will flow into the center tube, thus causing the temperature of the gas within the center tube to decrease dramatically. As stated above, air is pulled through the UV curing lamp system 4 in order to cool the components of the UV curing lamp system. The pulling of the air through the UV curing lamp system 4 creates a substantial vacuum within the UV curing lamp system. Therefore, if an air seal of the center tube has malfunctioned, or if a crack or fracture in the center tube has occurred, a substantial flow of air will be pulled into the center tube, thereby decreasing the temperature of the exhaust stream flowing out of the center tube.

In accordance with a first embodiment of the present invention, a thermal sensor 18 is disposed in the center tube exhaust gas stream adjacent to the exit end of the center tube of the UV curing lamp system 4. The thermal sensor 18 measures the temperature of the exhaust gas stream flowing out of the center tube. The computer 10 performs a defect detection method, which processes the output of the thermal sensor 18 to determine whether or not the temperature is below a predetermined threshold value. The computer 10 that is programmed to perform the defect detection method functions as the defect detector of the present invention. The defect detector of the present invention is designated by the dashed box labeled with the numeral 15 in FIG. 1. As discussed below in more detail, the defect detector of the present invention can take on forms other than that shown in FIG. 1.

When the temperature of the exhaust stream has dropped below the predetermined threshold value, a determination is made by the computer 10 that a defect in the condition of the center tube or a seal has occurred. Upon determining that the temperature is below the predetermined threshold value, the computer 10 causes an appropriate visual indication to be displayed on the display monitor 13. The computer 10 may cause the optical fiber manufacturing process to be halted until the condition of the center tube has been rectified. Although it is not necessary that the computer 10 halt the optical fiber manufacturing process, it is desirable because doing so will prevent an ongoing production of defective optical fiber.

It should also be noted that it is not necessary that the computer that performs the defect detection method of the present invention be the computer the controls the operations of the fiber draw tower 2. A separate computer may be utilized to perform this task, as will be understood by those skilled in the art. However, if the computer that is utilized to control the fiber draw tower 2 is also used to determine the condition of the center tube of the UV curing lamp system 4, a separate computer is not needed to perform the defect detection method. Those skilled in the art will understand that any computer that is capable of processing the output of a thermal sensor to determine whether or not the temperature output by the thermal sensor is below a predetermined threshold value is suitable for this purpose.

It should also be noted that a computer is not a necessary element of the present invention. Rather, a simple comparator circuit could be utilized to compare the output of the thermal sensor 18 to a predetermined threshold value. Those skilled in the art will understand the manner in which a suitable comparator circuit can be implemented for this purpose.

It should also be noted that the determination as to whether or not the temperature of the exhaust flowing from the center tube has dropped below a predetermined threshold value does not need to be performed electronically. Rather, a person could periodically measure the center tube exhaust flow using a simple thermal sensor, such as a thermometer, that is capable of measuring temperatures within the range of temperatures that may be encountered. The person could determine when the temperature of the exhaust has dropped below the predetermined threshold value and then, if desired, halt the optical fiber manufacturing process in order to allow the defect in the center tube to be corrected. Another alternative would be to use a conventional analog meter that incorporates an analog temperature scale. A person could simply read the analog temperature scale of the meter to determine the temperature of the gas. Those skilled in the art will understand the manner in which such a device may be utilized to measure the temperature of the gas exiting the center tube.

It should be noted that the present invention is not limited to monitoring UV curing lamp systems that are used to cure optical fiber coating layers. UV curing lamp systems are also utilized in optical fiber manufacturing processes to cured inks that have been deposited on the optical fibers. The present invention is equally suitable for monitoring these UV curing lamp systems, as will be understood by those skilled in the art. It will also be understood by those skilled in the art that the present invention is suitable for monitoring UV curing lamp systems that are utilized in other environments, such as in the electronics industry, for example. Therefore, those skilled in the art will understand that the present invention is not limited to use in the optical fiber manufacturing industry. However, for purposes of illustration, the preset invention will be discussed in relation to an optical fiber manufacturing process in order to demonstrate the principles of the present invention.

Figure 2:
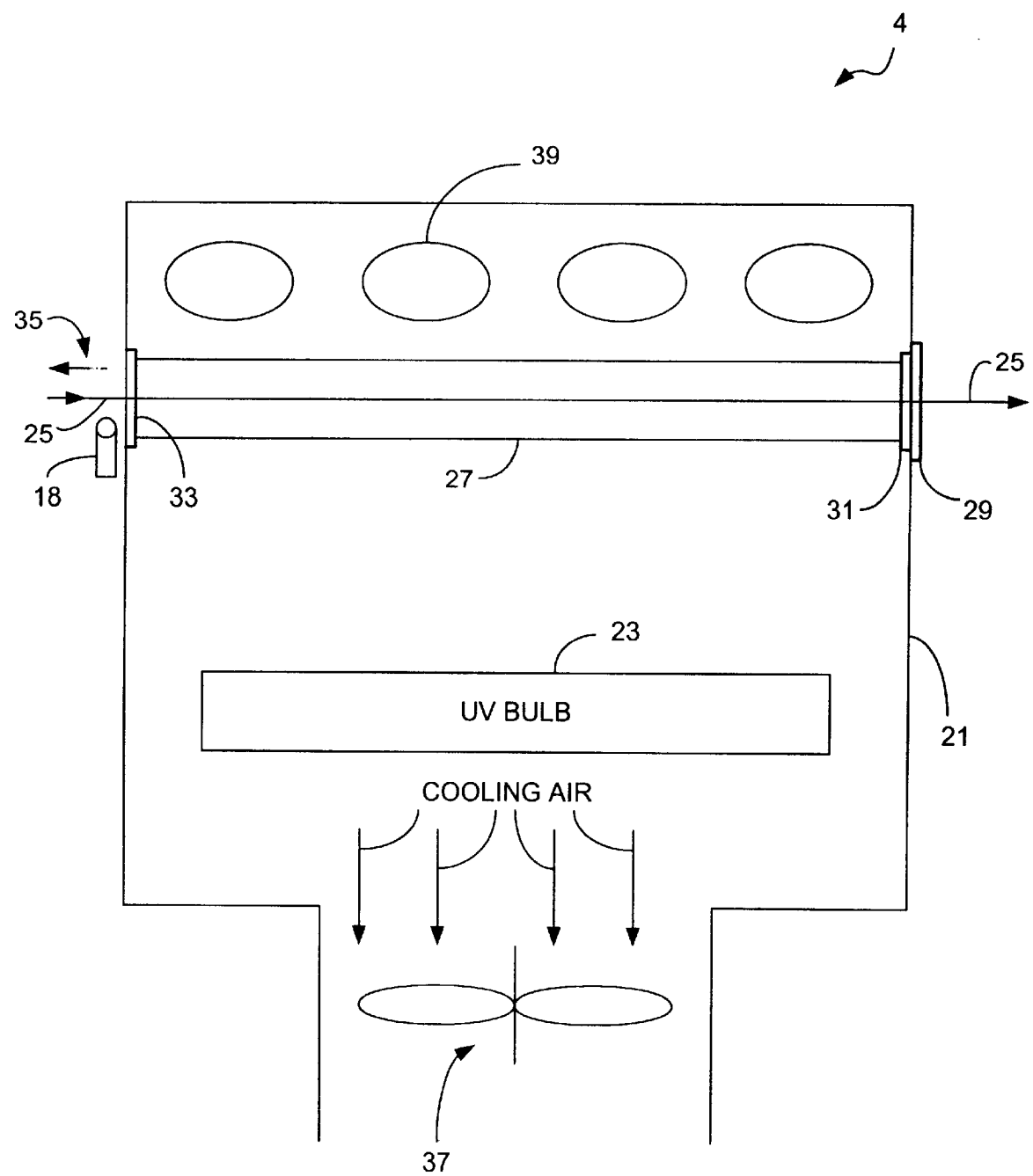
FIG. 2 illustrates a UV curing lamp system utilized in the optical fiber manufacturing system depicted in FIG. 1.

FIG. 2 illustrates a typical UV curing lamp system 4. The UV curing lamp system typically comprises a sheet metal housing 21, which contains the various components of the UV curing lamp system 4. A UV bulb 23 generates the UV radiation needed to cure the coating layer on the optical fiber 25. For ease of illustration, the focusing mirror assembly discussed above that focuses the UV radiation generated by the UV bulb 23 onto the optical fiber 25 is not shown. The optical fiber 25 having the coating to be cured thereon passes through a glass center tube 27 into which nitrogen gas is pumped in order to purge any oxygen from the center tube 27. A gate 29 couples the center tube 27 to a nitrogen source (not shown) which the nitrogen gas is pumped into the center tube 27. A first center tube seal 31 seals an end of the center tube and prevents air from entering the center tube 27. A second center tube seal 33 seals the opposite end of the center tube 27 and prevents air from entering the center tube. The nitrogen exhaust, which is represented by arrow 35 in FIG. 2, exits the end of the center tube 27.

A fan 37 crates an air flow which pulls cooling air in from vents 39 in the UV curing lamp system 4. The cooling air is pulled across the components of the UV curing lamp system 4, including the center tube 27, the focusing mirrors (not shown), and the UV bulb 23. As stated above, when one of the air seals 31 or 33 is defective, or when a fracture has occurred in the glass center tube 27, air will be pulled into the center tube, thereby causing the temperature of the gas about the sensor 18 to drop dramatically. In accordance with the present invention, it has been determined that the condition of the center tube 27 can be monitored by disposing a thermal sensor in the exhaust flow 35 and measuring the temperature of the exhaust flow to determine whether or not the temperature has dropped below a predetermined threshold value.

Figure 3:
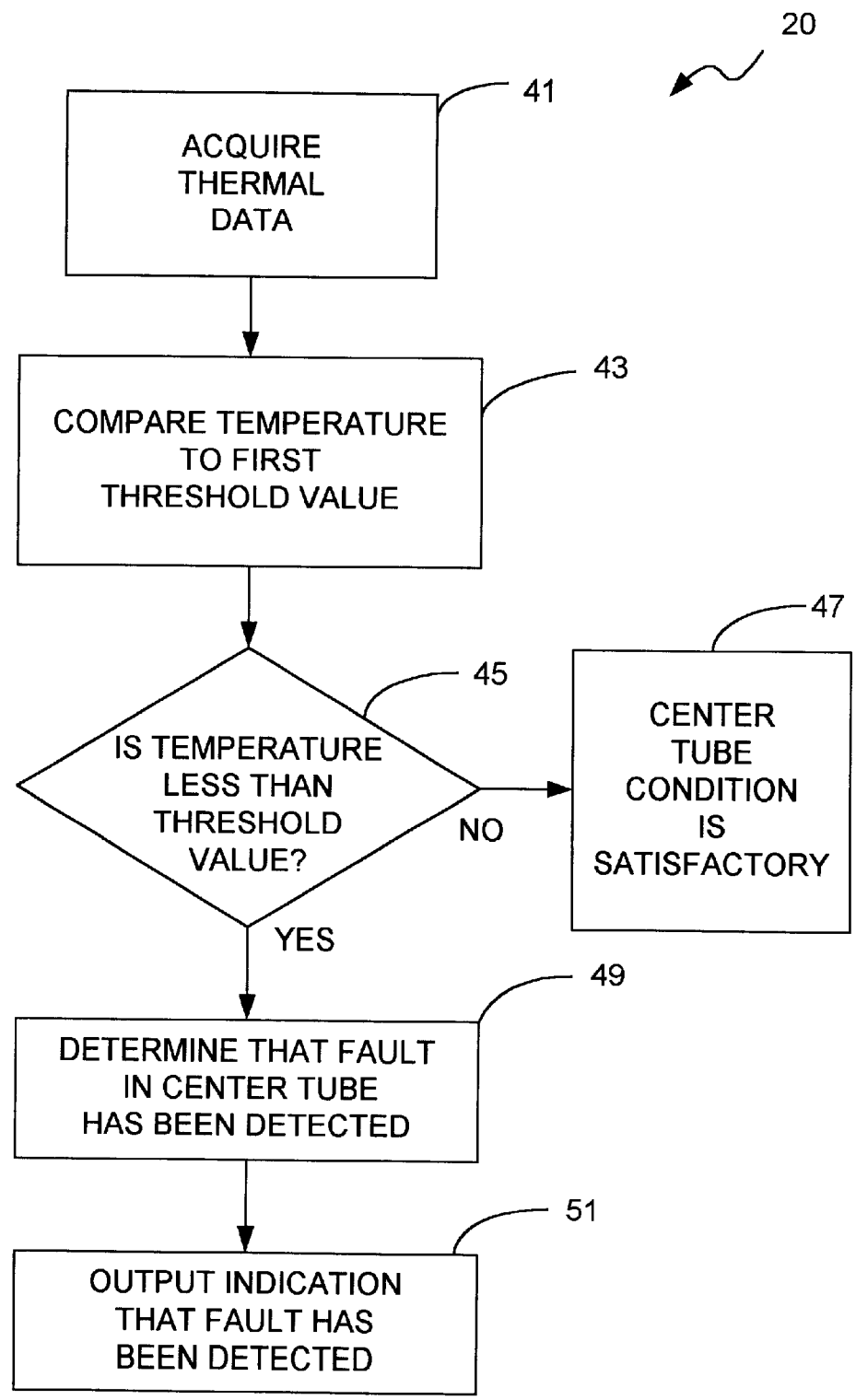
FIG. 3 is a flow chart illustrating the defect detection method of the present invention in accordance with one embodiment for determining whether or not air has entered the center tube of the UV curing lamp system illustrated in FIG. 2.

FIG. 3 is a flow chart illustrating the defect detection method 20. performed by the computer 10 shown in FIG. 1 in accordance with a first embodiment. The thermal sensor 18 acquires thermal data and outputs the thermal data to the computer 10. This data acquisition step is represented by block 41 in FIG. 3. The output of the thermal sensor may be a digital output or it may be an analog output which is converted into a digital number before being processed by the computer 10. In the case where the thermal sensor 18 does not produce a digital output, an analog-to-digital converter (not shown) is used to convert the output of the thermal sensor 18 into a digital number to be delivered to the computer 10.

The computer 10 performing the defect detection method 20 compares the temperature measured by the thermal sensor 18 to a first threshold value, as indicated by block 43. The computer 10 then determines whether or not the temperature is less than the first threshold value, as indicated by block 45. If the computer 10 determines that the temperature is not less than the first threshold value, a determination is made by the computer 10 that the condition of the center tube 27 is satisfactory, as indicated by block 47. An indication that the center tube condition is satisfactory may, if desired, be displayed on the display monitor 13.

If a determination is made at the step represented by block 45 that the temperature is less than the first threshold value, then the computer 10 determines that a fault in the center tube has been detected, as indicated by block 49. Preferably, the defect detection method 20 then causes an indication that a fault in the center tube has been detected to be displayed on the display monitor 13, as indicated by block 51.

It should be noted that an indication other than an indication displayed on a display monitor may be provided to a user or operator. For example, a light emitting diode (LED) could be located on a control panel that is visible to the user or operator, which would be turned on in the event that a determination has been made that a fault in the center tube has been detected. It should also be noted that the visual indicator could be controlled by a computer, such as computer 10, or it could be controlled by a simple comparator circuit that would compare the thermal sensor output to a predetermined threshold and generate a signal that drives the LED. Those skilled in the art will understand the manner in which these types of visual notifications may be implemented.

It should also be noted that it is not necessary that the indication be visual. An audio indication could also be provided, as will be understood by those skilled in the art. Those skilled in the art will understand the manner in which various audio indications may be provided.

Figure 4:
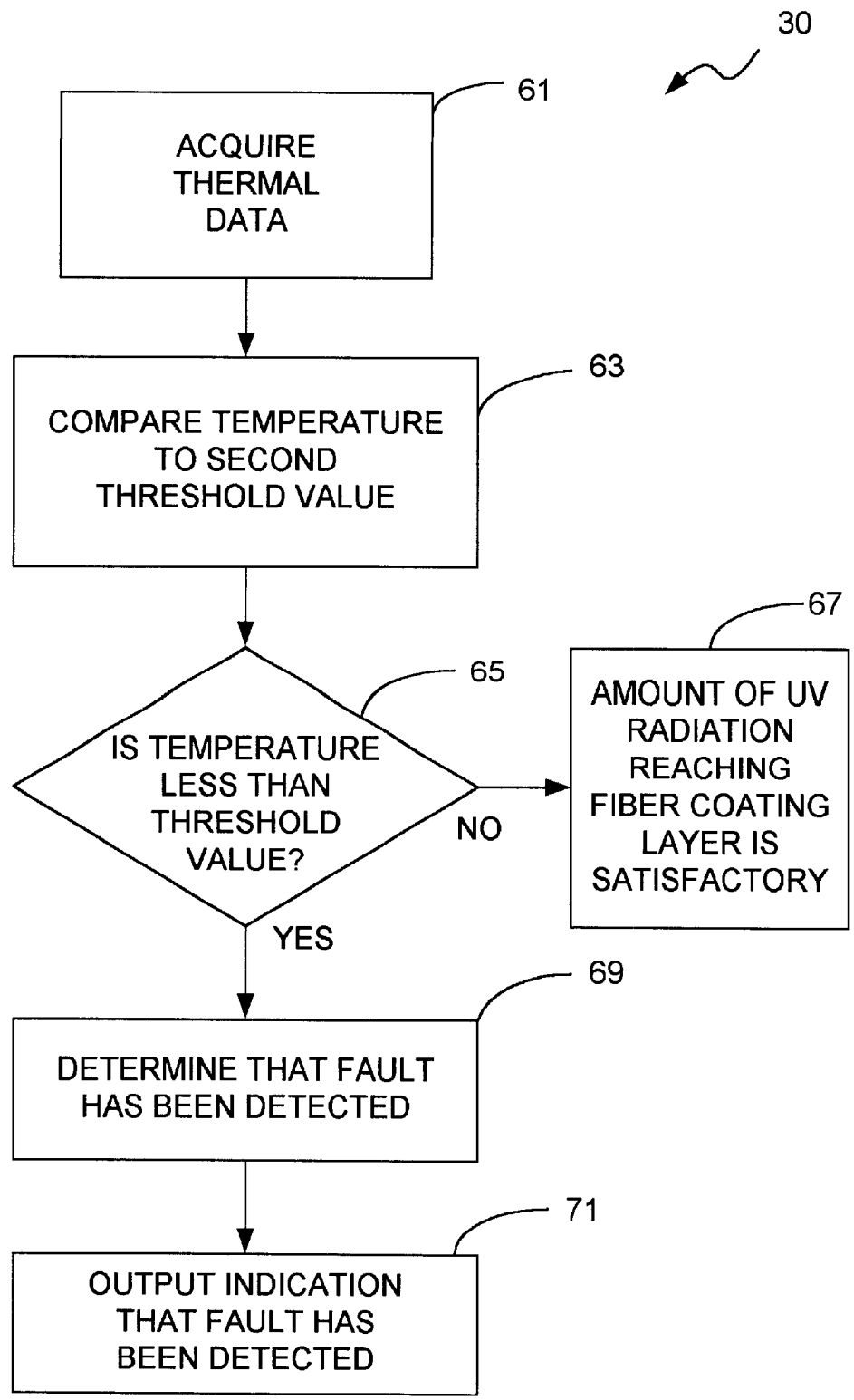
FIG. 4 is a flow chart illustrating the defect detection method of the present invention in accordance with one embodiment for detecting whether or not a sufficient amount of UV radiation is reaching the UV-curable material being cured by the UV curing lamp system shown in FIG. 2.

FIG. 4 is a flow chart representing the defect detection method 30 of the present invention in accordance with another embodiment. In accordance with this embodiment, the defect detection method 30 uses the output of the thermal sensor 18 to determine whether or not a sufficient amount of UV radiation is reaching the coating layer of an optical fiber 25 being cured by the UV curing lamp system 4. When air is pulled through the UV curing lamp system 4 by the fan 37, dust and other particulates may be deposited on the glass wall of the center tube 23 and on the surface of the parabolic mirrors (not shown). Also, during the curing process, an out-gas is released from the optical fiber being cured, which can accumulate on the inner surface of the center tube 27. All of these factors potentially can diminish the amount of UV radiation that reaches the optical fiber coating. Also, the amount of UV radiation generated by the UV bulb 23 is affected by the condition of the UV bulb 23. If the UV bulb 23 is close to the end of its life or is defective, the amount of UV radiation reaching the coating layer may diminish.

As stated above, typically the nitrogen gas exhaust temperature is about 200° F. However, when the amount of UV radiation reaching the coating layer of the optical fiber is less than the minimum amount needed to properly cure the coating layer, the temperature of the exhaust 35 will be below a second predetermined threshold value. This second threshold value is significantly greater than the threshold value referred to in blocks 43 and 45 in FIG. 3 because this second threshold value represents the minimum temperature of the nitrogen exhaust stream 35 when sufficient UV radiation is reaching the coating layer of the optical fiber 25. Therefore, this second threshold value may be, for example, 190° F. whereas the first threshold value may be approximately room temperature.

The defect detection method 30 functions in essentially the same manner as the defect detection method 20 discussed above with reference to FIG. 3, except that the defect detection method 30 utilizes the second threshold value to determine whether or not the amount of UV radiation reaching the coating is satisfactory.

The computer 10 acquires the thermal data from the thermal sensor 18, as indicated by block 61. The temperature measured by the thermal sensor 18 is then compared to the second threshold value, as indicated by block 63. A determination is then made at block 65 as to whether or not the temperature measured by the sensor 18 is less than the second threshold value. If not, a determination is made that the amount of UV radiation reaching the coating is satisfactory, as indicated by block 67.

If a determination is made at block 65 that the temperature is less than the second threshold value, then a determination is made that a fault exists in the UV lamp system 4, as indicated by block 69. An indication will then be provided that a fault has been detected, as indicated by block 71. This indication notifies a user or the operator that the UV curing lamp system 4 must be investigated to determine which of the above conditions exist, namely, whether the condition of the center tube, and/or of the parabolic mirrors and/or of the UV bulb have resulted in insufficient UV radiation reaching the coating layers of the optical fiber 25.

Figure 5:
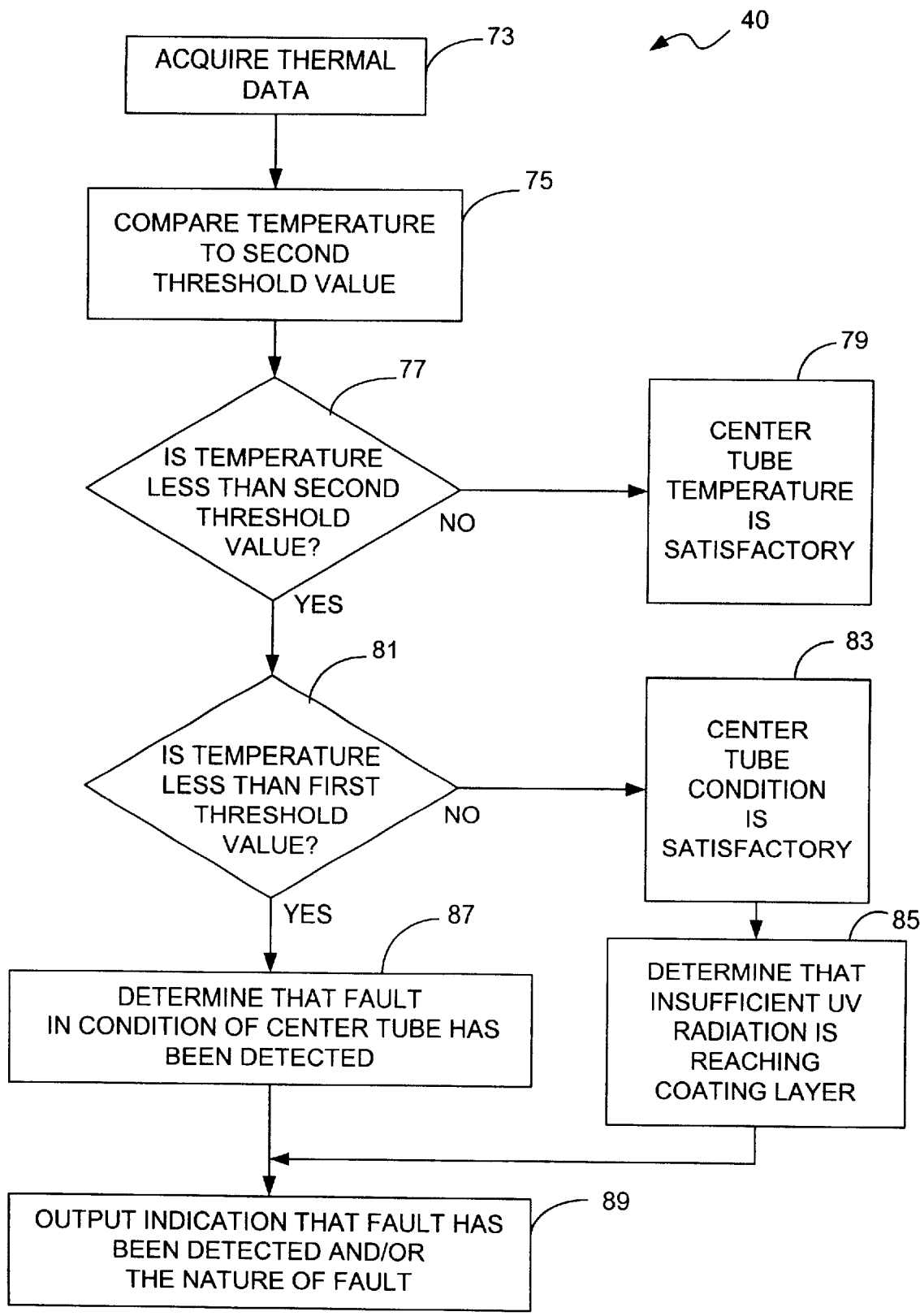
FIG. 5 is a flow chart representing the defect detection method of the present invention in accordance with one embodiment for determining whether or not air has entered the center tube and/or whether or not sufficient UV radiation is reaching the UV-curable material being cured by the UV curing lamp system shown in FIG. 2.

FIG. 5 is a flow chart representing an alternative embodiment of the present invention wherein the defect detection method 20 represented by the flow chart of FIG. 3 and the defect detection method 30 represented by the flow chart of FIG. 4 have been combined and integrated into a single defect detection method 40. The steps represented by blocks 73 and 75 in FIG. 5 are identical to the steps represented by blocks 61 and 63, respectively, in FIG. 4. The temperature measured by the temperature sensor 18 is compared to the second threshold value and a determination is made as to whether or not the temperature is less than the second threshold value, as indicated by block 77. If not, a determination is made that the amount of UV radiation reaching the coating is satisfactory, as indicated by block 79. As with the embodiments discussed above, the user or operator may be notified that the amount of UV radiation reaching the coating is satisfactory.

If a determination is then made that the temperature is less than the second threshold value, a determination is made as to whether or not the temperature is less than the first threshold value, as indicated at block 81. If not, a determination is made that the center tube condition is satisfactory, as indicated by block 83. The function represented by block 83 is identical to the function represented by block 47 in FIG. 3. Since a determination has been made at this point that the temperature is less than the second threshold value, but is not less than the first threshold value, a determination is made that insufficient UV radiation is reaching the UV coating layer, as indicated by block 85.

If a determination is made that the temperature is also less than the first threshold value, then a determination is made that a fault in the center tube has been detected, as indicated by block 87. The computer 10 then preferably causes an indication to be displayed on the display monitor 13 that a fault has been detected, which may include a description of the nature of the fault, as indicated by block 89. Therefore, an indication may be displayed on the display monitor that informs the user or operator that a fault has been detected in the center tube and/or that insufficient radiation is reaching the coating layer of the optical fiber.

It should be noted that the temperature of the exhaust stream when the UV curing lamp system is operating properly or improperly may vary depending on the particular UV lamp system being monitored. Those skilled in the art will understand that the first and/or second threshold values may also vary depending on the particular UV lamp system being monitored. It may be necessary or desirable to perform a calibration procedure to obtain suitable threshold values. Historical data relating to the particular UV lamp system, or to UV lamp systems in general, may also be gathered and utilized to obtain suitable threshold values.

It should be noted that the present invention has been described with reference to particular embodiments, but that the present invention is not limited to these embodiments. Those skilled in the art will understand that modification can be made to the embodiments discussed above that are also within the scope of the present invention. For example, those skilled in the art will understand that the defect detection method can be modified to compare the temperature measured by the thermal sensor with a larger number of threshold values in order to more accurately pinpoint the exact nature of a defective condition existing in one or more of the components of the UV curing lamp system.

Also, those skilled in the art will understand that other conditions within the UV curing lamp system can be measured either directly or indirectly by a thermal sensor or by some other detection device in order to accurately pinpoint the nature of a defective condition. Those skilled in the art will understand the manner in which the defect detection methods of the present invention discussed above can be modified in order to achieve these objectives, and that all such modifications are within the scope of the present invention.

It should also be noted that the location at which the thermal sensor is disposed is not limited to being located in the center tube purge gas exhaust stream. By disposing the thermal sensor in the exhaust stream at a location outside of the UV curing lamp system housing, convenient access to the thermal sensor is made possible and the thermal sensor does not interfere with the curing process or the drawing of the fiber. However, as will be understood by those skilled in the art, the thermal sensor may be located at any location suitable for measuring the temperature of the gas (e.g., inside of the center tube, on the outer surface of the center tube, etc.). Various suitable locations for the sensor may be found through experimentation, as will be understood by those skilled in the art.

What is claimed is:

1. An optical fiber manufacturing system, the system comprising:
   a fiber draw tower assembly, the fiber draw tower assembly comprising a coating applicator and a UV curing lamp system, the UV curing lamp system capable of applying UV radiation to an optical fiber having a coating layer thereon in order to cure the coating layer, the coating layer being applied to the optical fiber by the coating applicator, the UV curing lamp system comprising a transmissive center tube through which an optical fiber having a coating layer thereon passes, the UV curing lamp system comprising a V bulb that generates UV radiation for curing the coating layer, wherein a gas is pumped into the center tube in order to purge air from the center tube, the gas exiting the center tube in an exhaust stream via an exhaust opening;

a sensor disposed to measure a temperature of the exhaust stream as the exhaust stream exits the center tube; and a defect detector in communication with the sensor, the defect detector receiving an electronic signal from the sensor, the electronic signal corresponding to the temperature of the exhaust stream, the defect detector comparing the electrical signal to a first threshold value to determine whether or not the temperature of the exhaust stream is below a threshold temperature, wherein if a determination is made that the temperature of the exhaust stream is below the threshold temperature, the defect detector determines that the coating layer is not being properly cured.

2. The optical fiber manufacturing system of claim 1, wherein the defect detector includes an electronic comparator circuit, and wherein if the comparator circuit determines that the electrical signal is below the first threshold value, the comparator circuit determines that air has entered the center tube, thereby preventing the coating layer from being properly cured.

3. The optical fiber manufacturing system of claim 1, wherein the defect detector includes a computer, the computer being programmed to perform a defect detection method, wherein when the defect detection method is performed by the computer, the computer compares the electrical signal corresponding to the temperature measured by the sensor with the first predetermined threshold value to determine whether or not air has entered the center tube of the UV curing lamp system due to a defect associated with the center tube, wherein if a determination is made that the electrical signal is below the first threshold value, the computer determines that air has entered the center tube.

4. The optical fiber manufacturing system of claim 3, further comprising:

a display monitor in communication with the computer, wherein if the computer determines that air has entered the center tube, the computer causes a corresponding indication to be displayed on the display monitor.

5. The optical fiber manufacturing system of claim 4, wherein the computer is in communication with the fiber draw tower assembly, the computer controlling one or more operations of the fiber draw tower assembly, wherein if the computer determines that air has entered the center tube due to a defect associated with the center tube, the computer causes the operations being performed by the fiber draw tower assembly to be halted in order to allow the defect associated with the center tube to be corrected.

6. The optical fiber manufacturing system of claim 1, wherein the defect detector includes a computer, the computer being programmed to perform a defect detection method wherein when the defect detection method is performed by the computer, the computer compares the electrical signal corresponding to the temperature with a first threshold value to determine whether or not sufficient UV curing radiation is impinging on the coating layer of the optical fiber, wherein if the computer determines that the temperature is less than the first threshold value, the computer determines that insufficient UV radiation is impinging on the coating layer.

7. The optical fiber manufacturing system of claim 3, wherein when the defect detection method is performed by the computer, the computer compares the electrical signal corresponding to the temperature with a second threshold value to determine whether or not sufficient UV curing radiation is impinging on the coating layer of the optical fiber, wherein if the computer determines that the temperature is less than the second threshold value, the computer determines that insufficient UV radiation is impinging on the coating layer.

8. The optical fiber manufacturing system of claim 7, wherein if the computer determines that the temperature is less than the second threshold value and greater than the first threshold value, the computer determines that no defect associated with the center tube exists, but that insufficient UV radiation is impinging on the coating layer, and wherein if the computer determines that the temperature is less than the first and second threshold values, the computer determines that a defect associated with the center tube exists, and that sufficient UV radiation is impinging on the coating layer.

9. The optical fiber manufacturing system of claim 8, further comprising:

a display monitor in communication with the computer, wherein if the computer determines that a defect associated with the center tube exists, or if the computer determines that insufficient UV radiation is impinging on the coating layer, the computer causes a corresponding indication to be displayed on the display monitor.

10. The optical fiber manufacturing system of claim 9, wherein the computer is in communication with the fiber draw tower assembly, the computer controlling one or more operations of the fiber draw tower assembly, wherein if the computer determines that defect associated with the center tube exists, or if the computer determines that insufficient UV radiation is impinging on the coating layer, the computer causes the operations being performed by the fiber draw tower assembly to be halted.

11. An apparatus for monitoring a UV curing lamp system, the UV curing lamp system comprising a transmissive center tube through which a UV-curable material passes, the center tube being in communication with a source of gas from which gas is pumped into the center tube in order to purge air from the center tube, the gas exiting the center tube in an exhaust stream via an exhaust opening, the apparatus comprising:

a sensor, the sensor being disposed to measure a temperature of the exhaust stream as the exhaust stream exits the center tube;

a defect detector in communication with the sensor, the defect detector receiving an electronic signal from the sensor, the electronic signal corresponding to the temperature of the exhaust stream, the defect detector comparing the electrical signal to a first threshold value to determine whether or not the temperature of the exhaust stream is below a threshold temperature, wherein if a determination is made that the temperature of the exhaust stream is below the threshold temperature, the defect detector determines that the UV-curable material.

12. The apparatus of claim 11, wherein the defect detector includes an electronic comparator circuit, and wherein if the comparator circuit determines that the electrical signal is below the first threshold value, the comparator circuit determines that air has entered the center tube, thereby preventing the UV-curable material from being properly cured.

13. The apparatus of claim 11, wherein the defect detector includes a computer, the computer being programmed to perform a defect detection method, wherein when the defect detection method is performed by the computer, the computer compares the electrical signal corresponding to the temperature measured by the sensor with the first predetermined threshold value to determine whether or not air has entered the center tube of the UV curing lamp system due to a defect associated with the center tube, wherein if a determination is made that the electrical signal is below the first threshold value, the computer determines that air has entered the center tube.

14. The apparatus of claim 13, further comprising:
a display monitor in communication with the computer, wherein if the computer determines that air has entered the center tube, the computer causes a corresponding indication to be displayed on the display monitor.

15. The apparatus of claim 14, wherein the computer is in communication with a fiber draw tower assembly, the computer controlling one or more operations of the fiber draw tower assembly, wherein if the computer determines that air has entered the center tube due to a defect associated with the center tube, the computer causes the operations being performed by the fiber draw tower assembly to be halted in order to allow the defect associated with the center tube to be corrected.

16. The apparatus of claim 11, wherein the defect detector includes a computer, the computer being programmed to perform a defect detection method wherein when the defect detection method is performed by the computer, the computer compares the electrical signal corresponding to the temperature with a first threshold value to determine whether or not sufficient UV curing radiation is impinging on the UV-curable material, wherein if the computer determines that the temperature is less than the first threshold value, the computer determines that insufficient UV radiation is impinging on the UV-curable material.

17. The apparatus of claim 13, wherein when the defect detection method is performed by the computer, the computer compares the electrical signal corresponding to the temperature with a second threshold value to determine whether or not sufficient UV curing radiation is impinging on the UV-curable material, wherein if the computer determines that the temperature is less than the second threshold value, the computer determines that insufficient UV radiation is impinging on the UV-curable material.

18. The apparatus of claim 17, wherein if the computer determines that the temperature is less than the second threshold value and greater than the first threshold value, the computer determines that no defect associated with the center tube exists, but that insufficient UV radiation is impinging on the UV-curable material, and wherein if the computer determines that the temperature is less than the first and second threshold values, the computer determines that a defect associated with the center tube exists, and that sufficient UV radiation is impinging on the UV-curable material.

19. The apparatus of claim 18, further comprising:
a display monitor in communication with the computer, wherein if the computer determines that a defect associated with the center tube exists, or if the computer determines that insufficient UV radiation is impinging on the UV-curable material, the computer causes a corresponding indication to be displayed on the display monitor.

20. The apparatus of claim 19, wherein the computer is in communication with the fiber draw tower assembly, the computer controlling one or more operations of the fiber draw tower assembly, wherein if the computer determines that defect associated with the center tube exists, or if the computer determines that insufficient UV radiation is impinging on the UV-curable material, the computer causes the operations being performed by the fiber draw tower assembly to be halted, wherein the UV-curable material is a UV-curable coating layer disposed on an optical fiber, the optical fiber having the coating layer thereon passing through the center tube.

21. A method for determining whether a UV curing lamp system is properly curing a UV-curable material, the method comprising the steps of
measuring a temperature of an exhaust stream exiting a center tube of the UV curing lamp system;
analyzing the temperature to determine whether the temperature is below a first threshold value; and
if the temperature is below the first threshold value, determining that the UV-curable material is not being properly cured.

22. The method of claim 21, wherein the method is performed by a human being.

23. The method of claim 21, wherein the method is performed by a computer, the computer being programmed to perform a defect detection method, wherein when the defect detection method is performed by the computer, the computer compares the temperature with the first threshold value to determine whether or not air is entering the center tube thereby preventing the UV-curable material from being properly cured, wherein if the computer determines that the temperature is below the first threshold value, the computer determines that air is entering the center tube.

24. A method for determining whether a UV curing lamp system is properly curing a UV-curable material, the method comprising the steps of:
measuring a temperature of an exhaust stream exiting a center tube of the UV curing lamp system;
analyzing the temperature to determine whether the temperature is below a first threshold value;
if the temperature is below the first threshold value, determining that the UV-curable material is not being properly cured;
comparing the temperature with a second threshold value;
analyzing the temperature to determine whether the temperature is below a second threshold value; and
if the temperature if below the second threshold value, determining that the UV-curable material is not being properly cured.

25. The method of claim 24, wherein the method is performed by a human being.

26. The method of claim 24, wherein the method is performed by a computer, the computer being programmed to perform a defect detection method, wherein when the defect detection method is performed by the computer, the computer compares the temperature with the first and second threshold values, wherein if the computer determines that the temperature is below the first threshold value, the computer determines that air is entering the center tube, thereby preventing the UV-curable material from being properly cured, and wherein if the computer determines that the temperature is below the second threshold value, the computer determines that insufficient UV radiation is impinging on the UV-curable material, thereby preventing the UV-curable material from being properly cured.

27. A computer program for determining whether a UV-curable material is being properly cured by UV radiation impinging thereon as the UV-curable material passes through a UV curing lamp system, the computer program being embodied on a computer-readable medium, the program comprising:

a first code segment, the first code segment acquiring a digital temperature measurement, the temperature measurement corresponding to the temperature of gas exiting a center tube comprised by the UV curing lamp system, the gas being pumped into the center tube to purge air from the center tube, the gas exiting the center tube in an exhaust stream via an exhaust opening;

a second code segment, the second code segment analyzing the temperature to determine whether or not the temperature is below a first threshold value, wherein if the second code segment determines that the temperature is below the first threshold value, the second code segment determines that the UV-curable material is not being properly cured.

28. The program of claim 27, wherein the second code segment compares the temperature measurement with the first threshold value to determine whether or not air is entering the center tube, thereby preventing the UV-curable material from being properly cured, wherein if the second code segment determines that the temperature is below the first threshold value, the second code segment determines that air is entering the center tube.

29. The program of claim 27, wherein the second code segment compares the temperature measurement with the first threshold value to determine whether or not sufficient UV radiation is impinging on the UV-curable material, thereby preventing the UV-curable material from being properly cured, wherein if the second code segment determines that the temperature is below the first threshold value, the second code segment determines that insufficient UV radiation is impinging on the UV-curable material.

30. A computer program for determining whether a UV-curable material is being properly cured by UV radiation impinging thereon as the UV-curable material passes through a UV curing lamp system, the computer program being embodied on a computer-readable medium, the program comprising:

a first code segment, the first code segment acquiring a digital temperature measurement, the temperature measurement corresponding to the temperature of gas exiting a center tube comprised by the UV curing lamp system, the gas being pumped into the center tube to purge air from the center tube, the gas exiting the center tube in an exhaust stream via an exhaust opening;

a second code segment, the second code segment analyzing the temperature to determine whether or not the temperature is below a first threshold value, wherein if the second code segment determines that the temperature is below the first threshold value, the second code segment determines that the UV-curable material is not being properly cured, wherein the second code segment compares the temperature measurement with the first threshold value to determine whether or not air is entering the center tube, thereby preventing the UV-curable material from being properly cured, wherein if the second code segment determines that the temperature is below the first threshold value, the second code segment determines that air is entering the center tube; and a third code segment, the third code segment analyzing the temperature measurement to determine whether the temperature is below a second threshold value, wherein if the third code segment determines that the temperature measurement is below the second threshold value, the third code segment determines that insufficient UV radiation is impinging on the UV-curable material, thereby preventing the UV-curable material from being properly cured.

* * * * *